(12) United States Patent
Park et al.

(10) Patent No.: US 9,632,357 B2
(45) Date of Patent: Apr. 25, 2017

(54) DISPLAY DEVICE

(75) Inventors: Chilkeun Park, Seoul (KR);
Sangcheon Kim, Seoul (KR);
Mangeun Kim, Seoul (KR); Hyouk Kwon, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 14/415,354

(22) PCT Filed: Jul. 17, 2012

(86) PCT No.: PCT/KR2012/005687
§ 371 (c)(1),
(2), (4) Date: Apr. 22, 2015

(87) PCT Pub. No.: WO2014/014134
PCT Pub. Date: Jan. 23, 2014

(65) Prior Publication Data
US 2015/0293405 A1 Oct. 15, 2015

(51) Int. Cl.
*G02F 1/1335* (2006.01)
*G02F 1/1339* (2006.01)

(52) U.S. Cl.
CPC .... *G02F 1/133608* (2013.01); *G02F 1/13394* (2013.01); *G02F 1/133524* (2013.01);
(Continued)

(58) Field of Classification Search
CPC ................................................ G02F 1/133608
See application file for complete search history.

(56) References Cited

U.S. PATENT DOCUMENTS

| 7,530,711 B2 | 5/2009 | Bang .............................. 362/241 |
| 8,164,564 B2 | 4/2012 | Kim et al. .................... 345/102 |

(Continued)

FOREIGN PATENT DOCUMENTS

| CN | 1144913 | 3/1997 |
| CN | 1842737 | 10/2006 |

(Continued)

OTHER PUBLICATIONS

Partial Supplementary European Search Report dated Jan. 8, 2016 issued in Application No. 12881193.2.

(Continued)

*Primary Examiner* — Paisley L Arendt
*Assistant Examiner* — Edmond Lau
(74) *Attorney, Agent, or Firm* — KED & Associates, LLP

(57) ABSTRACT

A display device comprises a display panel and a backlight unit. The backlight unit comprises: a bottom cover; a light source module mounted on the bottom cover and including: light sources arranged at uniform intervals; and a circuit board on which the light sources are mounted; a reflective layer placed above the light source module to reflect the light emitted from the light sources towards the display panel; a screening layer disposed over the reflective layer at a distance therefrom and having patterned holes to allow only a portion of the light reflected from the reflective layer to be transmitted; and a spacer disposed between the reflective layer and the screening layer to form a light guide layer defined by a vacant space between the reflective layer and the screening layer and to maintain the uniform height of the light guide layer.

14 Claims, 10 Drawing Sheets

(52) U.S. Cl.
 CPC .. *G02F 1/133553* (2013.01); *G02F 1/133603* (2013.01); *G02F 1/133611* (2013.01); *G02F 2001/13398* (2013.01); *G02F 2001/133607* (2013.01); *G02F 2202/28* (2013.01)

(56) References Cited

U.S. PATENT DOCUMENTS

| | | | |
|---|---|---|---|
| 8,742,435 B2* | 6/2014 | Tanaka | F21V 3/00 257/59 |
| 2006/0012730 A1 | 1/2006 | Chen et al. | |
| 2007/0052662 A1* | 3/2007 | Kim | G02F 1/133605 345/102 |
| 2007/0070625 A1 | 3/2007 | Bang | |
| 2007/0103908 A1 | 5/2007 | Tabito et al. | |

FOREIGN PATENT DOCUMENTS

| | | |
|---|---|---|
| JP | 2006-278077 A | 10/2006 |
| JP | 2010-009950 A | 1/2010 |
| KR | 10-0653070 B1 | 11/2006 |
| KR | 10-2007-0069499 A | 7/2007 |

OTHER PUBLICATIONS

European Search Report dated Apr. 13, 2016 issued in Application No. 12881193.2.
Chinese Office Action dated Jul. 5, 2016 issued in Application No. 201280074767.8.
International Search Report dated Mar. 22, 2013 issued in Application No. PCT/KR2012/005687.

* cited by examiner

DISPLAY DEVICE

CROSS-REFERENCE TO RELATED PATENT APPLICATION

This application is a U.S. National Stage Application under 35 U.S.C. §371 of PCT Application No. PCT/KR2012/005687, filed Jul. 17, 2012, whose entire disclosure is incorporated herein by reference.

TECHNICAL FIELD

The present disclosure relates to a display device.

BACKGROUND ART

Various needs for display devices are increasing with the development of information society and in response to the needs, various display devices such as a liquid crystal display (LCD), plasma display panel (PDP), an electro luminescent display (ELD) and vacuum fluorescent display (VFD) has recently been developed and is being used.

Among others, the liquid crystal panel of the LCD includes, a liquid crystal layer, a TFT substrate and a color filter substrate that face each other, with the liquid crystal layer therebetween, and since the liquid crystal panel is not self-emissive, it is possible to use light provided from a backlight unit for displaying a picture.

A light source installed at the backlight unit may be one of a light emitting diode (LED) chip and an LED package including at least one LED chip.

Recently, a flat fluorescent lamp (FFL) or surface light source (SLS) is being actively applied to a light source for the LCD panel. A surface light source is perceived as a light source having a uniformly shiny surface and no thickness, and since the backlight unit is thinned by the using of the surface light source, it is possible to achieve thinness in a display device.

Also, a light guide layer configuring the backlight unit has typically been filled with separate transparent resins but a backlight unit including a light guide layer having a vacuum state or an air layer is being recently proposed.

DISCLOSURE OF THE INVENTION

Technical Problem

Embodiments provide a backlight unit including a light guide layer having a vacant space, in which the backlight unit has a support structure that supports various optical sheets placed on the light guide layer so that the height of the light guide layer is uniformly maintained.

Technical Solution

In one embodiment, a display device includes: a display panel; and a backlight unit providing light from a lower side of the display panel, wherein the backlight unit comprises: a bottom cover; a light source module mounted on the bottom cover and including: a plurality of light sources arranged at uniform intervals; and a circuit board on which the plurality of light sources are mounted; a reflective layer placed above the light source module to reflect the light emitted from the light sources towards the display panel; a screening layer disposed over the reflective layer at a distance therefrom and having a plurality of patterned holes to allow only a portion of the light reflected from the reflective layer to be transmitted; and a spacer disposed between the reflective layer and the screening layer to form a light guide layer defined by a vacant space between the reflective layer and the screening layer and to maintain the uniform height of the light guide layer.

Advantageous Effects

An embodiment having the above-described configuration has advantages in that the shape of a backlight unit including a light guide layer having a vacant space therein is well maintained and the height of the light guide layer is uniformly maintained.

Also, it also has an advantage in that a spacer functioning as a support transmits, refracts and reflects light emitted from a light source to make the luminescence of the backlight unit uniform.

MODE FOR CARRYING OUT THE INVENTION

In the following, a display device according to an embodiment is described in detail with reference to the accompanying drawings.

Figure 1:
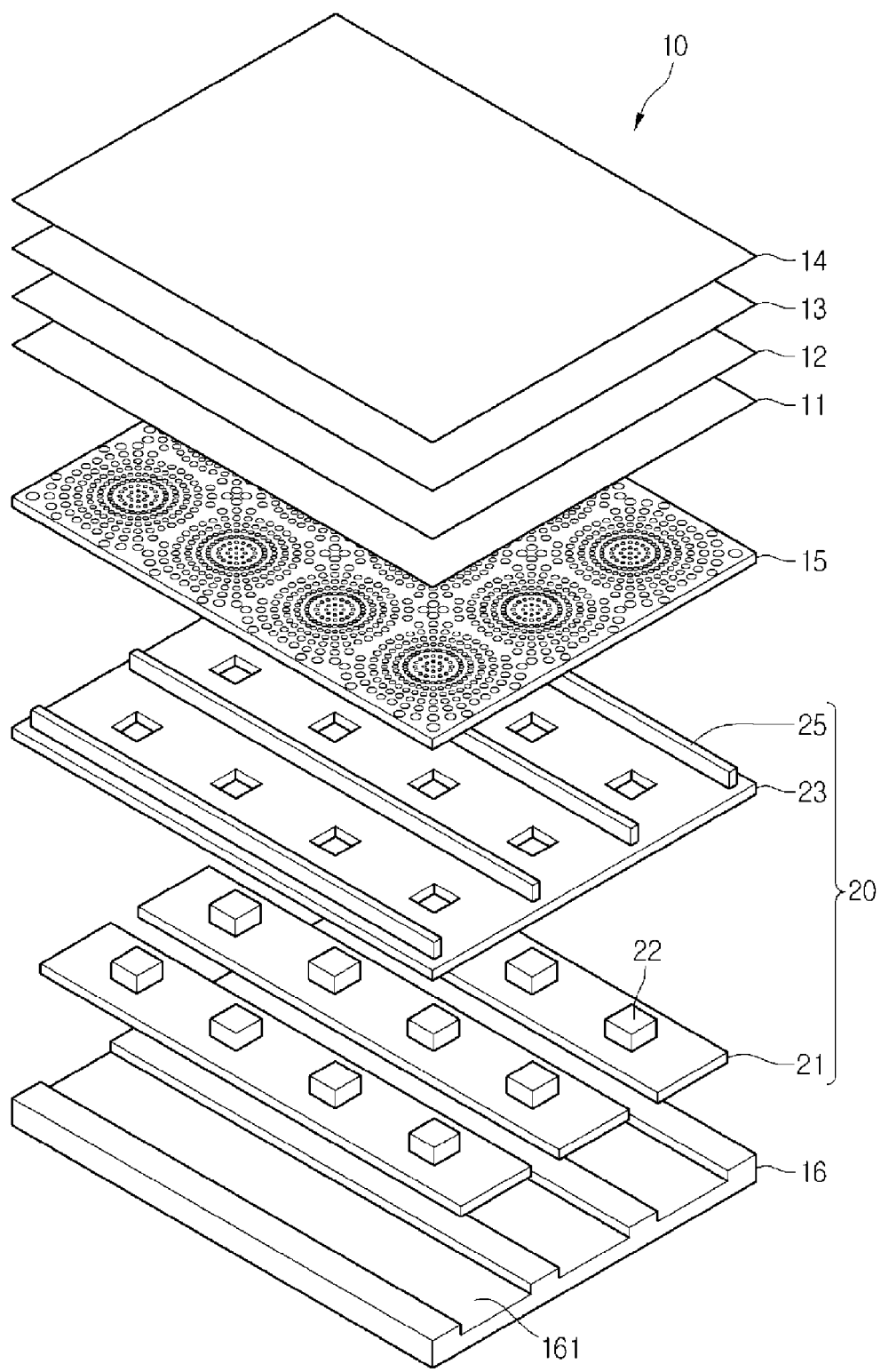
FIG. 1 is an exploded, perspective view of a display device according to a first embodiment.
Figure 2:
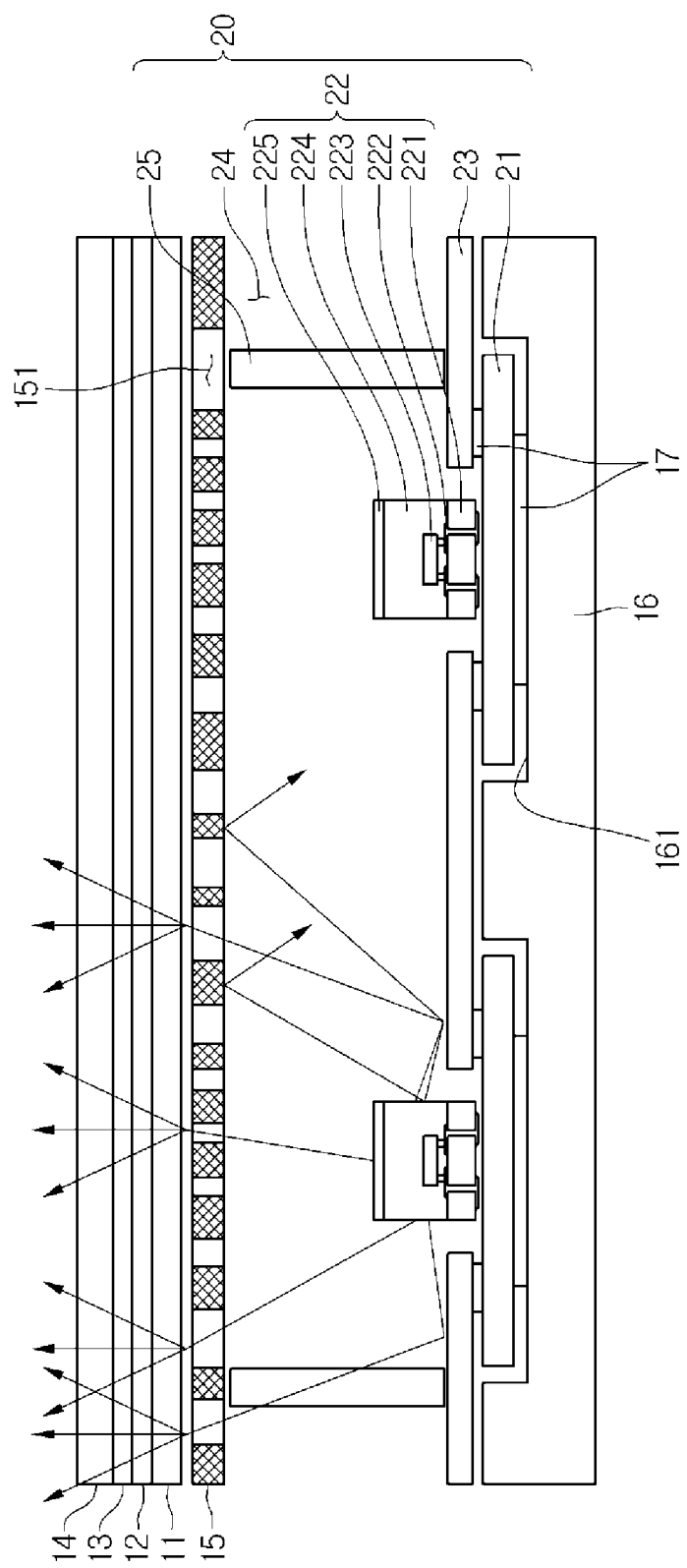
FIG. 2 is a longitudinal sectional view of the display device.
Figure 3:
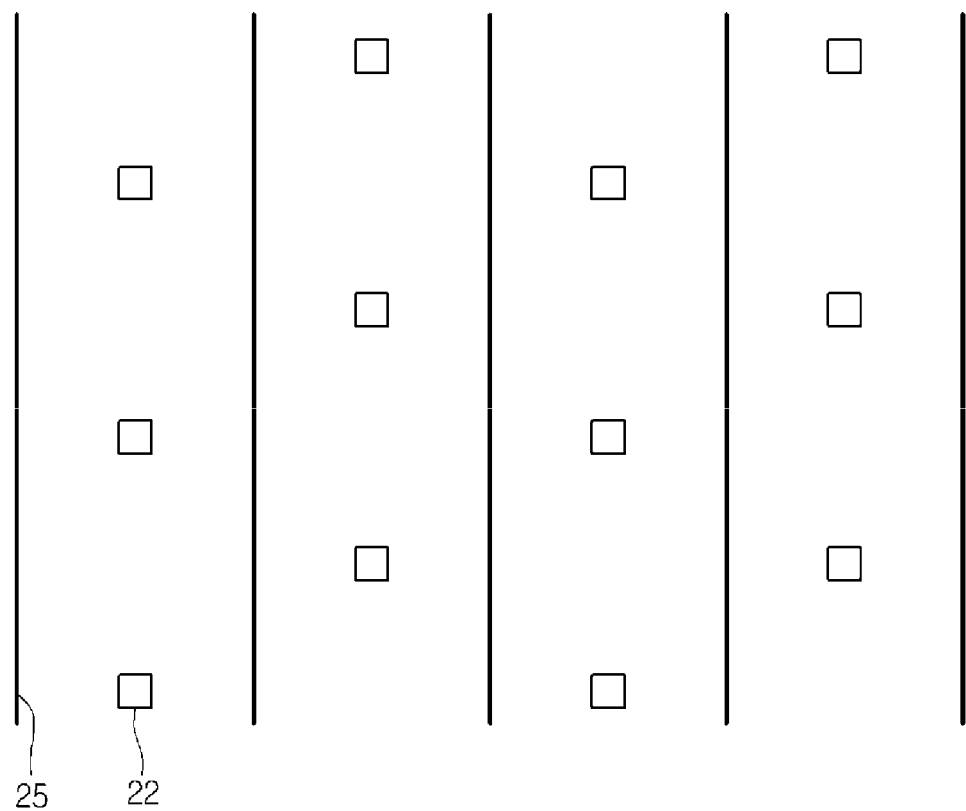
FIG. 3 is a plane view of how a spacer according to a first embodiment is installed.

FIG. 1 is an exploded, perspective view of a display device according to a first embodiment, FIG. 2 is a longitudinal, sectional view of the display device, and FIG. 3 is a plane view of how a spacer according to a first embodiment is installed.

Referring to FIGS. 1 to 3, a display device 10 according to the first embodiment includes a bottom cover 16, a backlight unit 20 placed on the bottom cover 16, and a liquid crystal panel placed on the top surface of the backlight unit 20.

In detail, the backlight unit 20 includes a light source module placed on the top surface of the bottom cover 16, a reflective layer 23 held on the light source module, a spacer 25 placed on the top surface of the reflective layer 23, and a light shielding surface 15 placed on the top surface of the spacer 25. In addition, a light guide layer 24 including a vacant space therein is formed between the reflective layer 23 and the screening layer 15. The light guide layer 24 may have a vacuum state or an air layer. In this example, the screening layer 15 may be perceived as a component for the backlight unit 20 or as a component for the liquid crystal panel.

In more detail, the light source module includes a circuit board 21 placed on the top surface of the bottom cover 16 and a light source 22 surface-mounted on the circuit board 21. The light source 22 includes a light emitting diode (LED) package. In addition, a mounting recess 161 on which the circuit board 21 is held is longitudinally formed on the top surface of the bottom cover 16. The light source module may be provided such that a plurality of light sources 22 is installed on the circuit board 21 at certain intervals, and a plurality of light source modules may be disposed side by side on the top surface of the bottom cover 16 at uniform intervals. Also, the light sources 22 of neighboring light source modules may also be disposed in a zigzag line or in the same line. The embodiment shows that the light sources of neighboring light source modules are disposed in a zigzag line.

Also, the light source 22 is formed such that a pair of electrodes 222 passes through a sub mount board, a light emitting element 223 including an LED is mounted on the electrode 222, and the light emitting element 223 is surrounded by a fluorescent layer 224 obtained by mixing a fluorescent material with a silicon resin. In addition, the top surface of the fluorescent layer 224 is evenly molded and a reflective layer 225 formed of a reflective material is disposed on the top surface of the fluorescent layer 224. The reflective layer 225 may be a material manufactured by mixing phenyl propanol amine (PPA), epoxy molding compound (EMC), micro cell polyethylene terephthalate (MC-PET), silver (Ag), aluminum (Al) metal having excellent reflectivity with a bead having a reflective, transmissive or refractive characteristic such as Ti, Al, Ag, or SiO2 by using a resin. Light emitted upwards from the light emitting element 223 by the reflective layer 225 is reflected to a lateral face of the fluorescent layer 224. In this example, the light emitting element 223 is a blue LED, a fluorescent material configuring the fluorescent layer is formed of a YAG phosphor, and thus a white light may be emitted from the light source 22.

The reflective layer 23 placed on the light source module covers the circuit board 24 and a though hole 231 is formed in a region corresponding to the location of the light source 22. In addition, the light source 22 passes through the though hole 231 and protrudes from the reflective layer 23. In addition, an adhesive 17 is applied to the bottom surface of the circuit board 21 and the bottom surface of the reflective layer 23 so that the circuit board is fixed to the mounting recess 161 of the bottom cover 16 and the reflective layer 23 is fixed to the circuit board 21.

Also, the spacer 25 plays a role in maintaining a constant distance between the screening layer 15 and the light source 22, and as shown in FIG. 2, the spacer is extended to have a height corresponding to the design height of the light guide layer 24 and a length corresponding to the length of the reflective layer 23. In addition, the spacer 25 may also have a shape of a linearly extended bar as shown in FIG. 2 or a shape in which a plurality of short ribs are arranged in the length direction of the reflective layer 23 at uniform intervals.

In detail, the spacer 25 may be formed of poly carbonate (PC), poly methyl methacrylate (PMMA), glass, resin, phenyl propanol amine (PPA), or Al metal to have a characteristic that light is transmitted, refracted or reflected. In addition, the spacer 25 may be installed by the applying of an adhesive to the top and bottoms surfaces of the spacer 25 and then UV curing or heat curing.

The screening layer 15 is a reflective sheet that transmits only a portion of light emitted vertically and upwards from the light source 22 and reflects remaining portions back, and a plurality of screening patterns may be formed on the screening layer. The screening layer 15 presented in the present embodiment is a hole patterned reflective sheet on which a plurality of holes 151 is formed. That is, light emitted from the light source 22 or reflected from the reflective layer 23 passes through the holes 151 and light impinging on other regions is reflected back to the reflective layer 23 or impinges on the spacer 25 to be refracted or reflected. In addition, the radius of the holes 151 progressively increases away from the central portion of the light source 22 so that the amount of transmitted light is more than the amount of reflected light, at a point distant from the light source 22. The reason is because the intensity of light becomes progressively stronger closer to the light source 22 and becomes progressively weaker away from the light source 22, and in order to uniformly maintain the luminescence of light throughout a display panel, the amount of transmitted light may progressively increase away from the light source 22 and progressively decrease closer to the light source 22.

Also, a liquid crystal panel, i.e., a display panel including a diffusion layer 11, a lower polarizer 12, a color filter substrate 13, and an optical sheet such as an upper polarizer 14 is placed on the screening layer 15. Since the structure and function of the display panel are the same as those of a typical flat-type display panel, a detailed description is not provided.

Since the spacer 25 is disposed between the screening layer 15 and the reflective layer 23 as shown in FIGS. 1 to 3, it is possible to keep the height of the light guide layer 24 constant and it is possible to prevent the display panel including the screening layer 15 from sagging. In addition, since the light guide layer 24 is maintained as a vacant space, there is an advantage in that it is possible to increase light diffusion efficiency.

In the following, a spacer that may be presented in another form is described. Since components excluding the spacer are the same as those presented in the first embodiment, a repetitive description is not provided.

Figure 4:
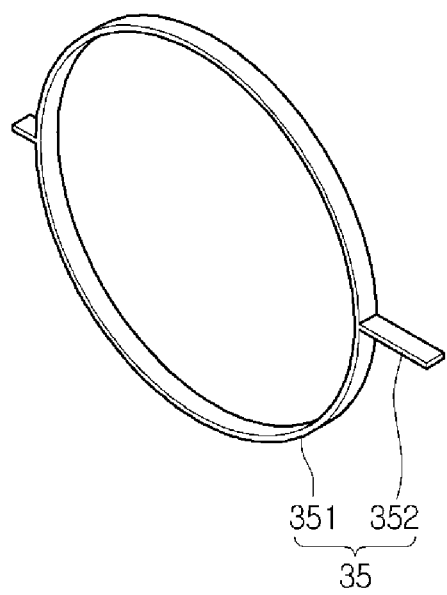
FIG. 4 is a perspective view of a spacer according to a second embodiment.
Figure 5:
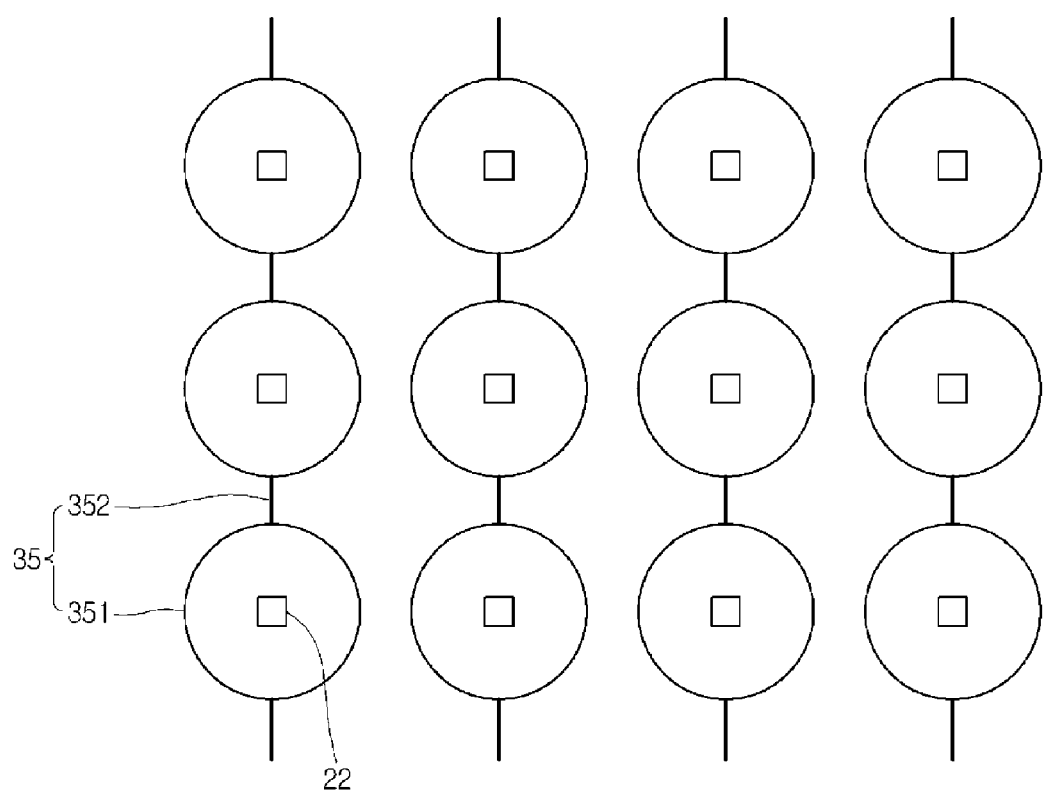
FIG. 5 is a plane view of how a spacer according to the second embodiment is disposed.

FIG. 4 is a perspective view of a spacer according to a second embodiment, and FIG. 5 is a plane view of how the spacer according to the second embodiment is disposed.

Referring to FIGS. 4 and 5, a spacer 35 according to the second embodiment may be provided in the shape of a circular ring as shown in FIGS. 4 and 5.

In detail, the spacer 35 includes a spacer body 351 surrounding the light source and having the shape of a circular ring, and a connection rib 352 connecting vertically neighboring spacer bodies 351. The light sources 22 may be linearly disposed at uniform horizontal intervals and the spacer bodies 351 may also be linearly disposed to be connected by the connection ribs 352.

Figure 6:
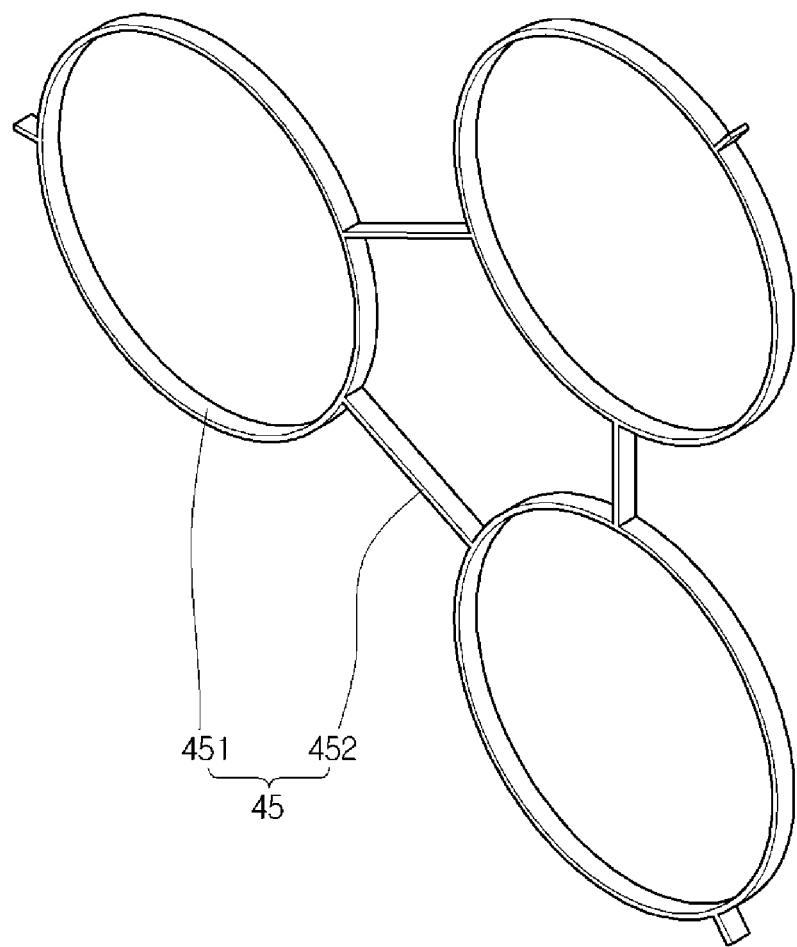
FIG. 6 is a perspective view of a spacer according to a third embodiment.
Figure 7:
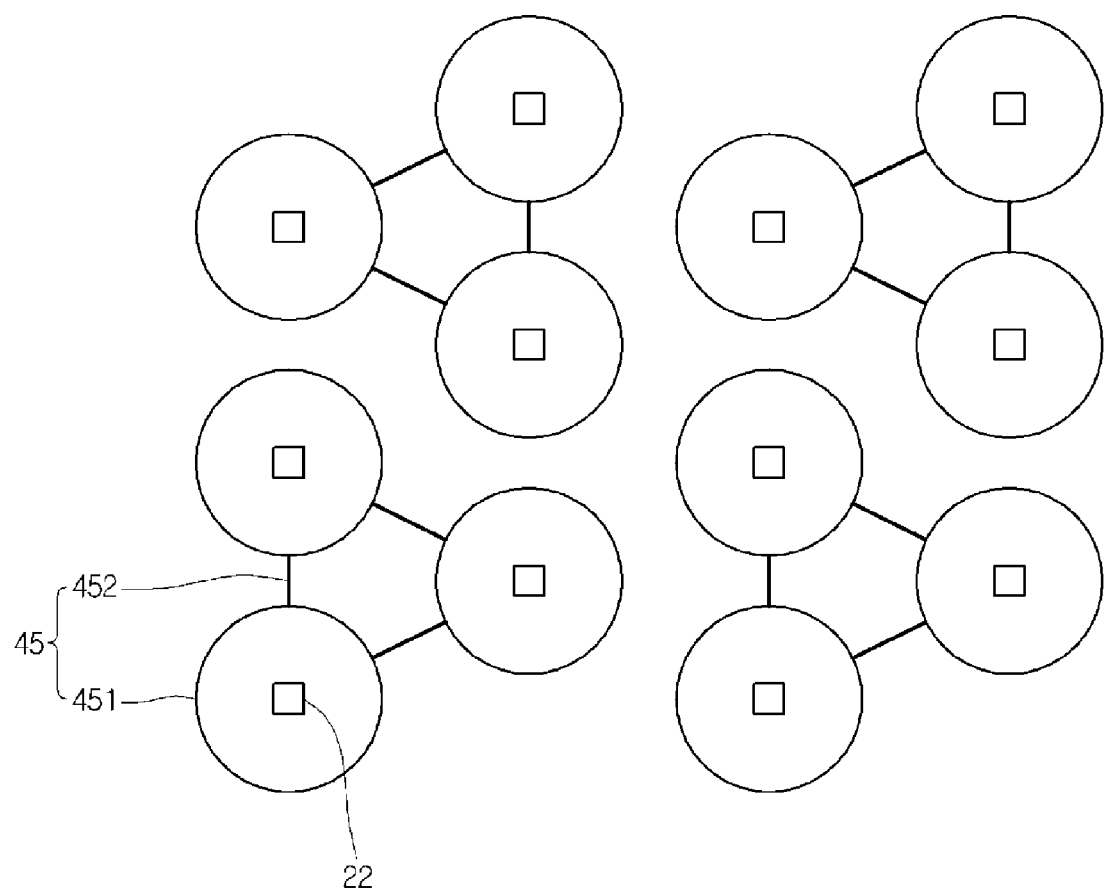
FIG. 7 is a plane view of how a spacer according to the third embodiment is disposed.

FIG. 6 is a perspective view of a spacer according to a third embodiment, and FIG. 7 is a plane view of how the spacer according to the third embodiment is disposed.

Referring to FIGS. 6 and 7, a spacer 45 according to the third embodiment includes spacer bodies 451 having the shape of a circular ring and connection ribs 452 connecting the spacer bodies, like the second embodiment. However, there is a difference in that vertically and horizontally neighboring spacer bodies 451 are connected by the connection ribs 452 unlike the second embodiment.

In detail, the light sources 22 are disposed in a zigzag line unlike the second embodiment and vertically neighboring spacer bodies 451 are connected to laterally neighboring spacer bodies 451 by the connection ribs 452 so that the spacer bodies form a triangle as a whole. When the light sources 22 are disposed in the same line vertically and horizontally, the spacer 45 would form a quadrangle.

Figure 8:
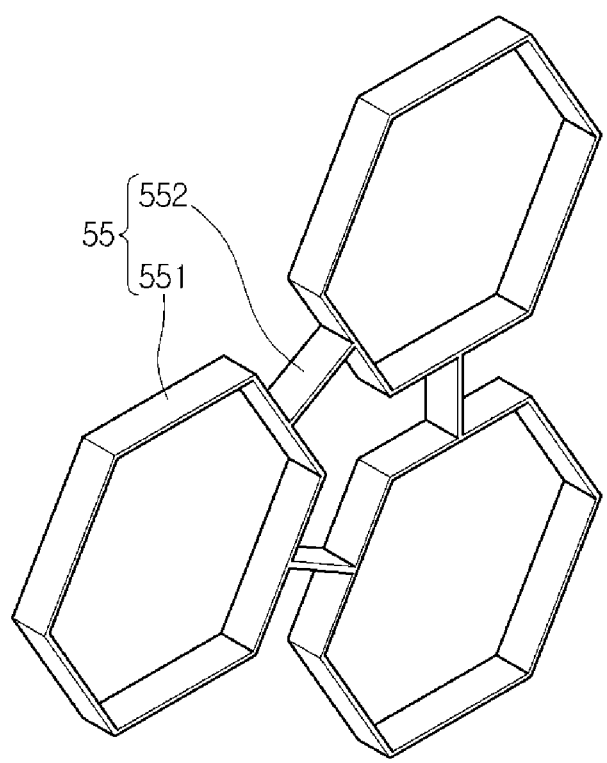
FIG. 8 is a perspective view of a spacer according to a fourth embodiment.
Figure 9:
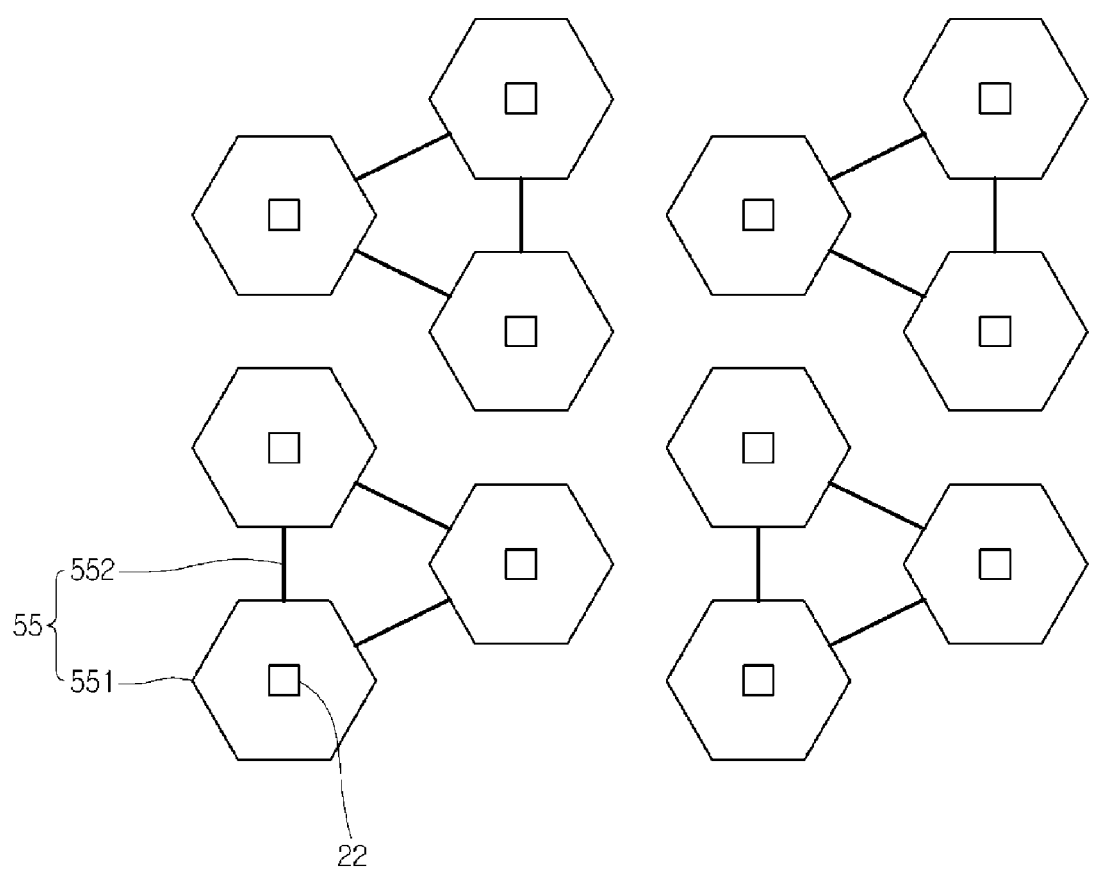
FIG. 9 is a plane view of how a spacer according to a fourth embodiment is disposed.

FIG. 8 is a perspective view of a spacer according to a fourth embodiment, and FIG. 9 is a plane view of how the spacer according to the fourth embodiment is disposed.

Referring to FIGS. 8 and 9, a spacer 55 according to the present embodiment is the same as that in the third embodiment but has a difference in that a spacer body 551 is polygonal and not circular. In addition, neighboring spacer bodies 551 are connected by connection ribs 552. In this example, it is noted that the polygonal spacer bodies 551 are not limited to a presented hexagon but may include all polygons including a triangle.

Figure 10:
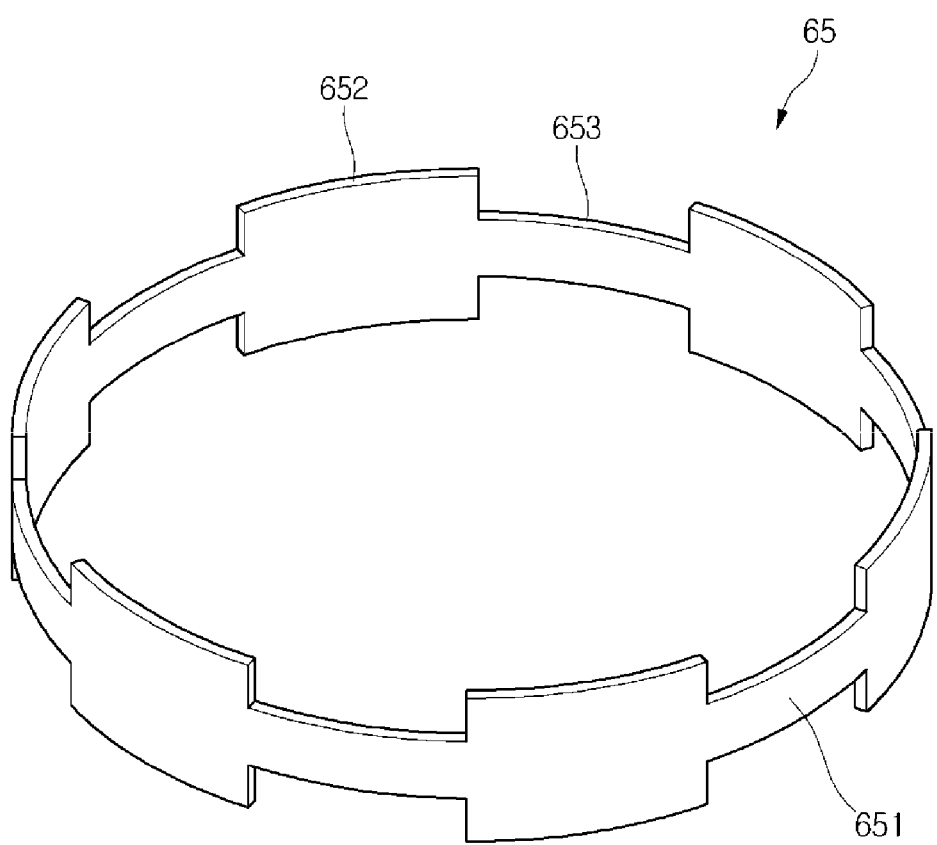
FIG. 10 is a perspective view of a spacer according to a fifth embodiment.
Figure 11:
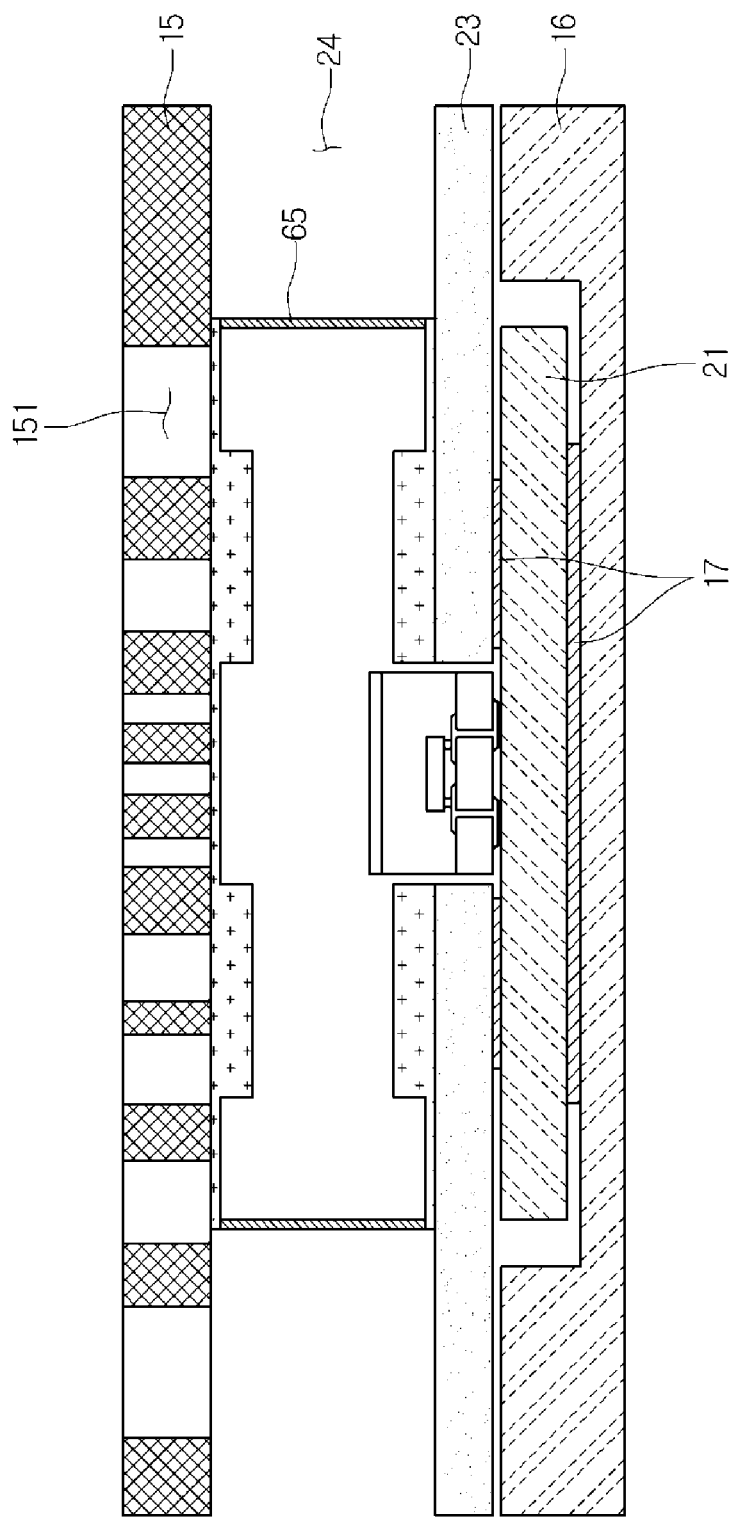
FIG. 11 is a longitudinal, sectional view of how a spacer according to the fifth embodiment is disposed.

FIG. 10 is a perspective view of a spacer according to a fifth embodiment, and FIG. 11 is a longitudinal, sectional view of how the spacer according to the fifth embodiment is disposed.

Referring to FIGS. 10 and 11, a spacer 65 according to the present embodiment has a shape proposed to decrease a difference in height in connecting the reflective layer 23 and the screening layer 15.

In detail, keeping the height of the screening layer 15 constant from the light source 22 works as an important factor in ensuring luminescence uniformity of a backlight structure. Thus, molding the spacer to have a constant height is very important. However, in the case of an injection-molded spacer having a single height, it is difficult to rule out the possibility that there is a difference in height depending on a position on the spacer. For example, when comparing a spacer having a 10 mm long top surface with a spacer having a 5 mm long top surface, a probability that there is a difference in height has no choice but to increase as the length of the spacer increases. In order to minimize the possibility that there is the difference in height, making the length of a surface being in direct contact with parts to uniformly maintain a height in the manufacturing process, i.e., the screening layer 15 and the reflective layer 23, shorter than that of a spacer and filling remaining parts with an adhesive are proposed.

A spacer 651 for achieving such an object includes a spacer body, a plurality of protrusions 652 protruding from the top and bottom surfaces of the spacer body 651, and a recessed portion 653 that is formed between the plurality of protrusions 652.

In detail, the vertical width of the spacer body 651 may be smaller than the height of the screening layer 24 and the spacer may be molded so that the protrusions 652 protrude from the top and bottom surfaces of the spacer body 651. Then, the recessed portion 653 is also formed between neighboring protrusions 652.

On the contrary, the height of the spacer body 651 may be smaller than the height of the screening layer 24 and a plurality of recessed portions 653 may be formed on the top and bottom surfaces of the spacer body 651.

Also, the spacer 65 may be formed in the shape of a circular ring as shown in FIG. 10 and may also be formed in the shapes presented in the first to fourth embodiments. In addition, while the spacer 65 is disposed between the screening layer 15 and the reflective layer 23, the adhesive 17 is applied to the top and bottom surfaces of the spacer 65. In this example, more amount of the adhesive 17 is applied to the recessed portion 653 in comparison to other portions.

In addition, since the height of the recessed portion 653 is maintained equally to that of the protrusion 652 by the adhesive 17, the screening layer 15 forms the flat top surface of the light guide layer 24. That is, the height of the spacer 65 is compensated for at the recessed portion 653 region by the adhesive 17. Since there are a portion precisely controlling the height and other portions on the spacer by such a structure, there is an effect in that it is possible to minimize the difference in height between the reflective layer 23 and the screening layer 15.

The invention claimed is:

1. A display device comprising:
   a display panel; and
   a backlight unit providing light from a lower side of the display panel,
   wherein the backlight unit comprises:
   a bottom cover;
   a light source module mounted on the bottom cover and including:
   a plurality of light sources arranged at uniform intervals; and
   a circuit board on which the plurality of light sources are mounted;
   a reflective layer placed above the light source module to reflect the light emitted from the light sources towards the display panel;
   a screening layer disposed over the reflective layer at a distance therefrom and having a plurality of patterned holes to allow only a portion of the light reflected from the reflective layer to be transmitted; and
   a spacer disposed between the reflective layer and the screening layer to form a light guide layer defined by a vacant space between the reflective layer and the screening layer and to maintain the uniform height of the light guide layer,
   wherein the spacer comprises a plurality of protrusions and a plurality of recessed portions which are alternately formed on top and bottom surfaces of the spacer, and
   wherein the plurality of protrusions are adhered to the reflective layer and the screening layer by an adhesive.

2. The display device according to claim 1, wherein the spacer is formed of at least one selected from a group consisting of poly carbonate (PC), poly methyl methacrylate (PMMA), glass, resin, phenyl propanol amine (PPA), an aluminum (Al) metal to have a characteristic that light is transmitted, refracted or reflected.

3. The display device according to claim 2, wherein the spacer is placed between neighboring light sources and has a shape of a continuously or discontinuously extended linear bar.

4. The display device according to claim 2, wherein the spacer comprises:
   a plurality of spacer bodies having a ring shape surrounding the light source; and
   a plurality of connection ribs connecting adjacent spacer bodies.

5. The display device according to claim 4, wherein the spacer bodies which are adjacent each other in a front-to-rear direction are connected by the connection ribs.

6. The display device according to claim 4, wherein the spacer bodies which are adjacent each other in a front-to-rear direction and a left-to-right direction are connected by the connection ribs.

7. The display device according to claim 4, wherein the spacer body includes a shape of a circular ring or of a polygonal ring.

8. The display device according to claim 1, wherein the plurality of recessed portions are filled with the adhesive to have a same height as the plurality of protrusions.

9. The display device according to claim 1, wherein a plurality of mounting recesses are formed in the bottom cover to allow the light sources to be mounted, and wherein the plurality of mounting recesses are disposed with a predetermined distance away from each other.

10. The display device according to claim 1, wherein a through hole through which the light source passes is formed at a predetermined position on the reflective layer corresponding to a location of the light source, and the light source passing through the through hole is exposed to and inside of the light guide layer.

11. The display device according to claim 1, wherein diameters of the patterned holes are configured to progressively increase away from the light source.

12. The display device according to claim 1, wherein the light source comprises a light emitting diode (LED) package, wherein the LED package comprises:

an LED element;

a fluorescent layer surrounding the LED element and having a flat top surface; and a reflective layer placed on a top surface of the fluorescent layer.

13. The display device according to claim 2, wherein an adhesive is applied to top and bottom surfaces of the spacer, and wherein the top and bottom surfaces of the spacer are UV cured or heat cured to be respectively adhered to the reflective layer and the screening layer.

14. The display device according to claim 9, wherein the light sources mounted on adjacent light source modules are disposed in a zigzag line.

* * * * *